(12) United States Patent
Singh

(10) Patent No.: US 11,782,739 B2
(45) Date of Patent: Oct. 10, 2023

(54) DETERMINING SEQUENCES OF INTERACTIONS, PROCESS EXTRACTION, AND ROBOT GENERATION USING ARTIFICIAL INTELLIGENCE / MACHINE LEARNING MODELS

(71) Applicant: UiPath, Inc., New York, NY (US)

(72) Inventor: Prabhdeep Singh, Bellevue, WA (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/696,120

(22) Filed: Mar. 16, 2022

(65) Prior Publication Data
US 2022/0206826 A1      Jun. 30, 2022

Related U.S. Application Data

(63) Continuation of application No. 17/070,168, filed on Oct. 14, 2020, now Pat. No. 11,301,269.

(51) Int. Cl.
| | | |
|---|---|---|
| *G06F 9/451* | (2018.01) | |
| *G06N 20/00* | (2019.01) | |
| *G06F 17/18* | (2006.01) | |

(52) U.S. Cl.
CPC .............. *G06F 9/451* (2018.02); *G06F 17/18* (2013.01); *G06N 20/00* (2019.01)

(58) Field of Classification Search
CPC .......... G06F 9/451; G06F 17/18; G06N 20/00
USPC ....................................................... 715/704
See application file for complete search history.

(56) References Cited

U.S. PATENT DOCUMENTS

| | | |
|---|---|---|
| 9,483,740 B1 | 11/2016 | Ansel et al. |
| 9,555,544 B2 | 1/2017 | Bataller et al. |
| 10,235,192 B2 | 3/2019 | Hall et al. |
| 10,354,225 B2 | 7/2019 | Sharma et al. |
| 10,365,799 B2 | 7/2019 | Hosbettu et al. |
| 10,489,126 B2 | 11/2019 | Kumar et al. |
| 10,613,838 B2 | 4/2020 | Kim et al. |
| 10,956,181 B2 | 3/2021 | Banne |
| 10,984,666 B1 | 4/2021 | DePaolo et al. |
| 11,144,179 B2 | 10/2021 | Sultan |
| 11,176,443 B1* | 11/2021 | Selva ...................... G06F 18/25 |

(Continued)

FOREIGN PATENT DOCUMENTS

| | | |
|---|---|---|
| CN | 111124888 A | 5/2020 |
| JP | 2020512122 A | 4/2020 |

(Continued)

OTHER PUBLICATIONS

William D Titcomb, "Notice of Allowance", dated Mar. 25, 2022, U.S. Appl. No. 17/129,740.

(Continued)

*Primary Examiner* — William D Titcomb
(74) *Attorney, Agent, or Firm* — LeonardPatel PC; Michael A. Leonard, II; Sheetal S. Patel

(57) ABSTRACT

Use of artificial intelligence (AI)/machine learning (ML) models is disclosed to determine sequences of user interactions with computing systems, extract common processes, and generate robotic process automation (RPA) robots. The AI/ML model may be trained to recognize matching n-grams of user interactions and/or a beneficial end state. Recorded real user interactions may be analyzed, and matching sequences may be implemented as corresponding activities in an RPA workflow.

28 Claims, 9 Drawing Sheets

(56) References Cited

U.S. PATENT DOCUMENTS

| | | | |
|---|---|---|---|
| 11,188,857 B1* | 11/2021 | Hill | G06F 3/167 |
| 11,226,832 B2 | 1/2022 | Westberg et al. | |
| 11,328,524 B2* | 5/2022 | Cristescu | G06V 30/414 |
| 2008/0215397 A1* | 9/2008 | Bhattacharya | G06Q 10/06 705/7.37 |
| 2011/0307228 A1* | 12/2011 | Kasabov | G06Q 10/04 703/2 |
| 2014/0012626 A1 | 1/2014 | Ajmera et al. | |
| 2017/0308800 A1 | 10/2017 | Cichon et al. | |
| 2018/0039565 A1* | 2/2018 | Rajagopalan | G06F 11/3476 |
| 2018/0052861 A1 | 2/2018 | Seetharaman et al. | |
| 2018/0113780 A1* | 4/2018 | Kim | G06N 3/02 |
| 2019/0051292 A1 | 2/2019 | Na | |
| 2019/0057457 A1 | 2/2019 | Gao et al. | |
| 2019/0102676 A1* | 4/2019 | Nazari | G06N 3/08 |
| 2019/0102684 A1 | 4/2019 | Beran et al. | |
| 2019/0236458 A1* | 8/2019 | Taylor | G06F 17/17 |
| 2019/0250891 A1* | 8/2019 | Kumar | G06F 18/2411 |
| 2019/0250893 A1* | 8/2019 | Pandit | G06N 20/00 |
| 2019/0324781 A1 | 10/2019 | Ramamurthy et al. | |
| 2019/0332073 A1* | 10/2019 | Nasle | G06Q 30/0206 |
| 2019/0354583 A1* | 11/2019 | Ralhan | G06F 16/13 |
| 2019/0379589 A1* | 12/2019 | Ryan | G06N 3/082 |
| 2020/0019418 A1* | 1/2020 | P K | G06F 17/18 |
| 2020/0033869 A1* | 1/2020 | Palanisamy | B60W 40/10 |
| 2020/0206920 A1* | 7/2020 | Ma | G06F 18/23213 |
| 2020/0219033 A1* | 7/2020 | Smutko | G06F 9/542 |
| 2020/0285977 A1* | 9/2020 | Brebner | H04W 4/33 |
| 2021/0182100 A1* | 6/2021 | Zhang | G06N 5/04 |
| 2021/0304064 A1* | 9/2021 | Mudi | G06N 3/044 |
| 2021/0326743 A1 | 10/2021 | Iftekharuddin et al. | |
| 2021/0358488 A1* | 11/2021 | Iyer | G10L 25/90 |

FOREIGN PATENT DOCUMENTS

| | | |
|---|---|---|
| KR | 20200094833 A | 8/2020 |
| WO | 2016109755 A1 | 7/2016 |
| WO | 2019010435 A1 | 1/2019 |
| WO | 2020092446 A3 | 8/2020 |

OTHER PUBLICATIONS

Andrew Sornborger et al., "A Pulse-gated, Neural Implementation of the Backpropagation Algorithm," NICE '19, Albany, New York (Mar. 26-28, 2019).

International Search Report & Written Opinion, dated Feb. 3, 2022, PCT Application No. PCT/US21/53489.

International Search Report & Written Opinion, dated Jan. 24, 2022, PCT Application No. PCT/US21/53493.

Michael Nielsen, "Neural Networks and Deep Learning Chapter 2—How the Backpropagation Algorithm Works," available on the web at http://neuralnetworksanddeeplearning.com/chap2.html (Dec. 2019).

Wikipedia Backpropagation Page available at https://en.wikipedia.org/wiki/Backpropagation (last accessed Oct. 13, 2020).

William D Titcomb, "Non-Final Office Action", dated Oct. 25, 2021, U.S. Appl. No. 17/070,168.

William D Titcomb, "Non-Final Office Action", dated Oct. 26, 2021, U.S. Appl. No. 17/129,740.

William D Titcomb, "Notice of Allowance", dated Feb. 16, 2022, U.S. Appl. No. 17/070,168.

William D. Titcomb, "Non-Final Office Action", dated May 18, 2023, U.S. Appl. No. 17/751,139.

* cited by examiner

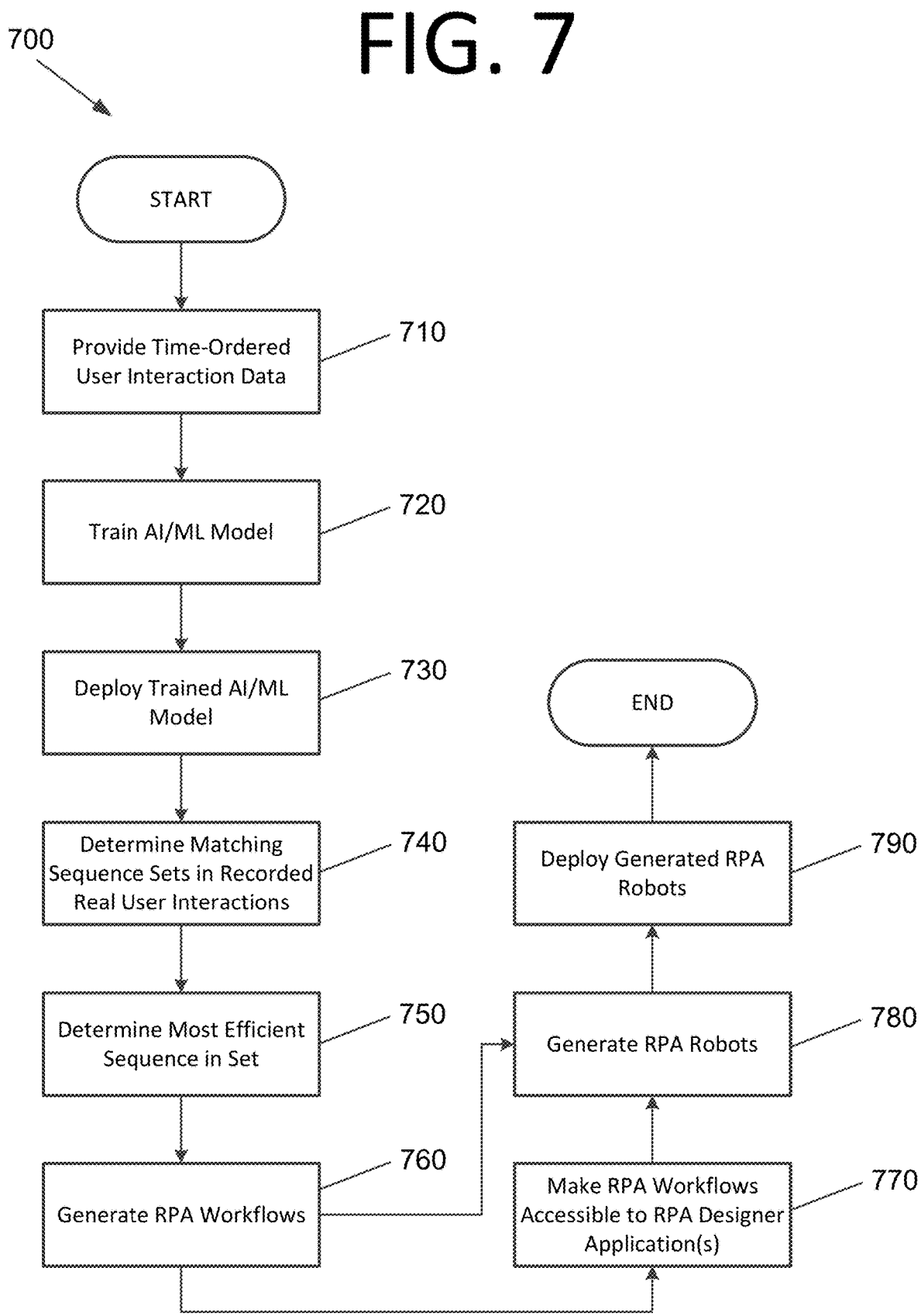

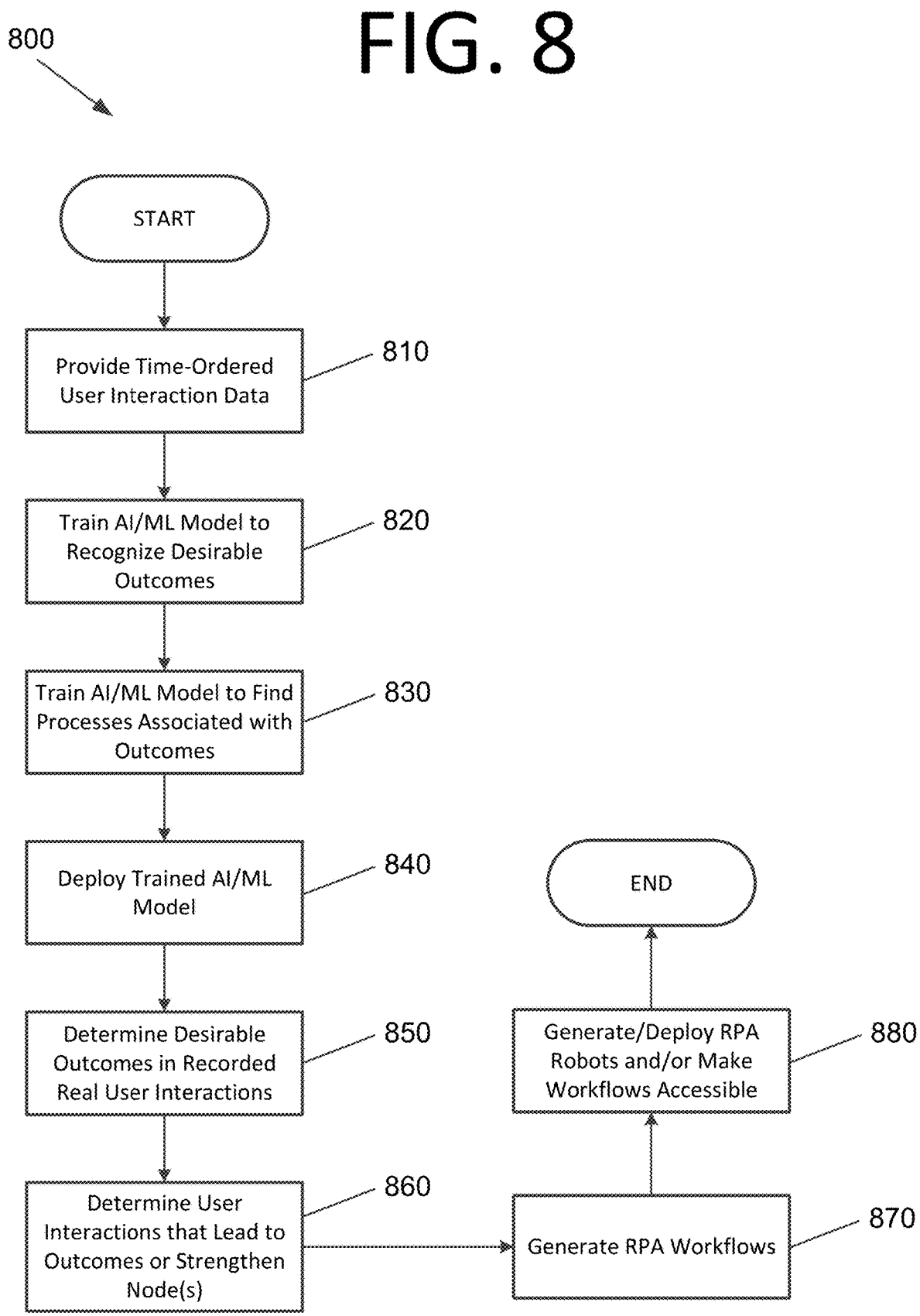

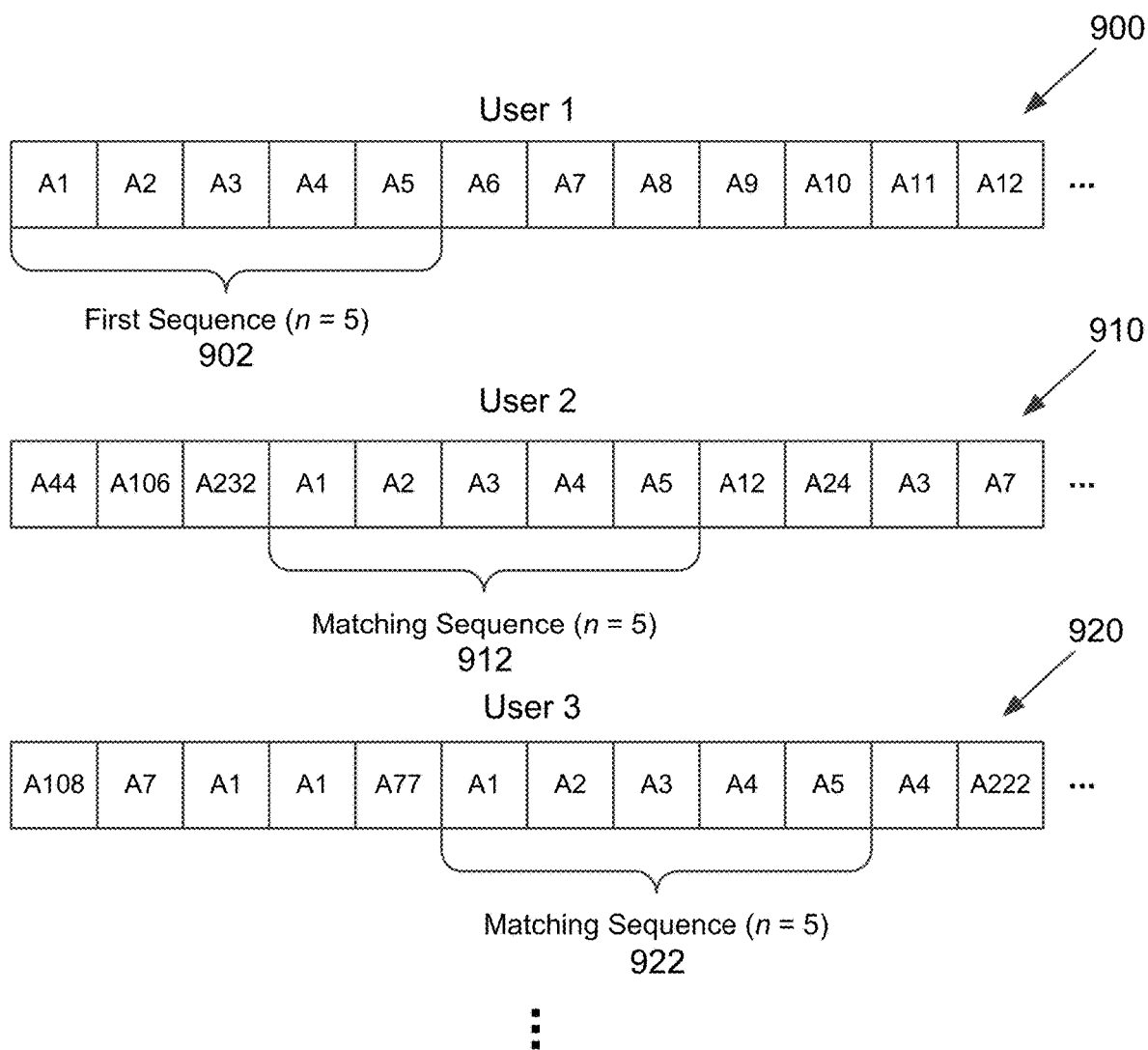

DETERMINING SEQUENCES OF INTERACTIONS, PROCESS EXTRACTION, AND ROBOT GENERATION USING ARTIFICIAL INTELLIGENCE / MACHINE LEARNING MODELS

CROSS-REFERENCE TO RELATED APPLICATION

This application is a continuation of, and claims priority to, U.S. Nonprovisional patent application Ser. No. 17/070,168 filed Oct. 14, 2020. The subject matter of this earlier filed application is hereby incorporated by reference in its entirety.

FIELD

The present invention generally relates to user interface (UI) automation, and more specifically, to determining sequences of user interactions with computing systems, extracting common processes, and generating robotic process automation (RPA) robots using artificial intelligence (AI)/machine learning (ML) models.

BACKGROUND

In order to perform UI automation, RPA technologies may utilize driver and/or application-level interactions to click buttons, enter text, and perform other interactions with a UI. However, key presses, mouse clicks, and other kernel hook information may not be available at the system level in some embodiments, or when building a new UI automation platform. Extensive driver level and application level functionality is typically required to implement such a UI automation platform. Furthermore, the way in which users interact with their computing systems may not be known. Accordingly, alternative techniques for providing UI automation may be beneficial.

SUMMARY

Certain embodiments of the present invention may provide solutions to the problems and needs in the art that have not yet been fully identified, appreciated, or solved by current UI automation technologies. For example, some embodiments of the present invention pertain to determining sequences of user interactions with computing systems, extracting common processes, and generating RPA robots using AI/ML models.

In an embodiment, a computer-implemented method includes providing, by a computing system, an AI/ML model with data including time-ordered interactions of a plurality of users with respective user computing systems. The computer-implemented method also includes training the AI/ML model, by the computing system, to recognize related sequences of user interactions that pertain to tasks in the time-ordered sequences of user interactions by comparing n-grams of sequences of user interactions in recorded data from the computing systems over a sliding window to find the related sequences. The n-grams include two or more values of n. The computer-implemented method further includes deploying the trained AI/ML model.

In another embodiment, A non-transitory computer-readable medium stores a computer program. The computer program is configured to cause at least one processor to analyze recorded real user interactions of a plurality of users with respective computing systems and determine sets of matching sequences in the recorded real user interactions, by an AI/ML model. The computer program is also configured to cause the at least one processor to generate one or more respective RPA workflows including activities that implement user interactions of the determined sets of matching sequences.

In yet another embodiment, a system includes memory storing computer program instructions and at least one processor configured to execute the computer program instructions. The computer program instructions are configured to cause the at least one processor to analyze recorded real user interactions of a plurality of users with respective computing systems and determine matching sequences in the recorded real user interactions, by an AI/ML model. The computer program instructions are also configured to cause the at least one processor to determine a most efficient sequence of the matching sequences. The computer program instructions are further configured to cause the at least one processor to generate one or more respective RPA workflows including activities that implement user interactions of the determined most efficient matching sequence.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is a flowchart illustrating a process for determining sequences of user interactions with computing systems, extracting common processes, and generating RPA robots using AI/ML models, according to an embodiment of the present invention.

FIG. 8 is a flowchart illustrating a process for performing process extraction based on a desirable end state using AI/ML models and generating RPA robots, according to an embodiment of the present invention.

FIG. 9 illustrates comparisons of n-grams representing sequences of user interactions, according to an embodiment of the present invention.

Unless otherwise indicated, similar reference characters denote corresponding features consistently throughout the attached drawings.

DETAILED DESCRIPTION OF THE EMBODIMENTS

Figure 1:
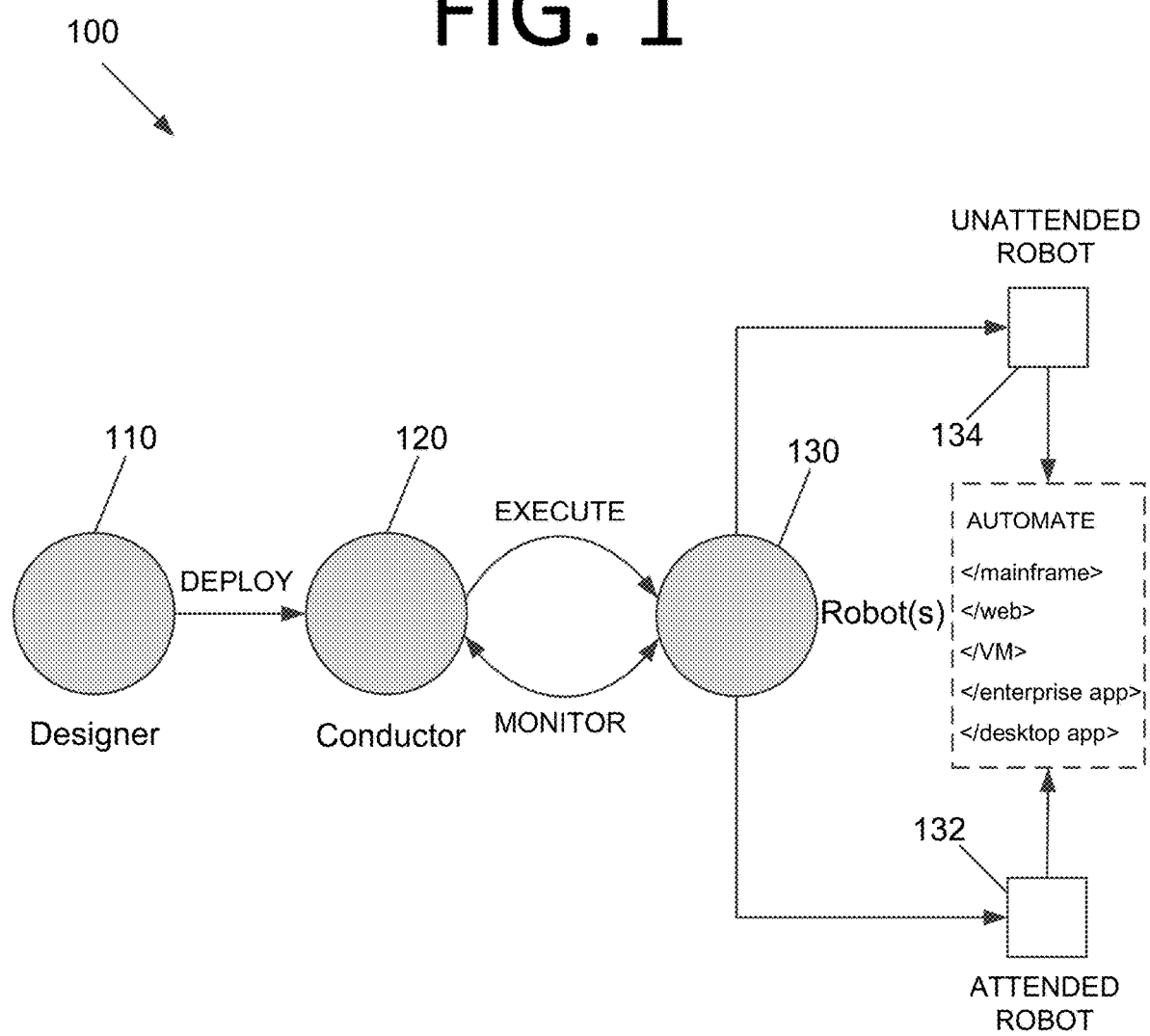
FIG. 1 is an architectural diagram illustrating a robotic process automation (RPA) system, according to an embodiment of the present invention.

Some embodiments pertain to determining sequences of user interactions with computing systems, extracting common processes, and generating RPA robots using AI/ML models. The user interactions may be determined by an AI/ML model that is trained to recognize applications, screens, and UI elements using computer vision (CV) and to recognize user interactions with the applications, screens, and UI elements. This AI/ML model may be the same AI/ML model that subsequently searches for sequences or a different AI/ML model. Individual user interactions may include, but are not limited to, a user clicking a button, entering text in a field, interacting with a menu, closing a window, moving to a different screen of an application, etc. An example of a sequence of user interactions may include, for example, opening an application, typing information into multiple text fields, and clicking a submit button.

User interactions may be extracted from data collected from multiple computing systems. For instance, the collected data may include video alone and/or other data collected from the computing systems, such as browser history, heat maps, file information, currently running applications and locations, system level and/or application-level information, etc. The extracted user interactions may then be combined into a sequence of interactions associated with a larger activity or task, such as writing and sending an email, entering information into a form and submitting it, modifying a spreadsheet based on information retrieved from a website, etc.

In some embodiments, n-grams of multiple sizes may be used to search for matching sequences in the data. If the lowest value of n is too small, too many matching sequences may be found to identify meaningful sequences. Conversely, if the lowest value of n is too large, meaningful matching sequences smaller than n may be missed. During training, a human reviewer could review identified sequences of a certain starting size n (e.g., 2, 3, 7, etc.). If this size yields too many non-useful sequences, the smallest sequence size may be incremented to n+1, then n+2, then n+3, etc. until the matching sequences tend to be useful. After the smallest useful n is determined (e.g., a smallest n that produces at least 10% useful sequences, at least 30%, at least 50%, at least 90%, etc.), sequences of that n-gram size or less may be ignored or not determined/considered. In some embodiments, the AI/ML model may automatically choose a minimum value for n based on a maximum number of matching sequences. In certain embodiments, a certain number of matches may be required for a sequence of a certain n-gram size to be considered. For instance, in a large organization, it may be required for dozens, hundreds, or thousands of matches to exist in order to automate the sequence since this would tend to indicate that multiple or many users perform this process.

Recurrent neural networks (RNNs) may be particularly adept at determining useful ranges of the values of n. An RNN may determine the optimum windowing threshold (i.e., the useful range of n values) via a trial-and-error process that involves a sweep of n-grams of varying sizes for useful sequences, and potentially a sweep of all sequence sizes in some embodiments. The RNN can then determine the most optimal range, potentially without human input. Such a system could be used to automatically determine whether a user is likely to leave a cloud computing service, for example, by looking for time-windowed sequences of user interactions that tended to indicate that a user was likely to leave the service. Steps could then be taken to try to retain the customer (e.g., having a human representative contact the customer, offering a lower service price, etc.).

In some embodiments, an upper bound on n may also be determined. For instance, if less than a certain number of sequences are found at and above a certain value of n, or no sequences are found at all, the size of n may be limited to less than that value. Also, if n is too large, the sequence may correspond to more than a given task and include other unrelated actions that more than one user happened to perform. This determination may be made by a human reviewer or automatically.

In certain embodiments, importance metric(s) may be used in addition to or in lieu of some or all of the sequence-limiting techniques discussed above. For instance, it may be considered whether a sequence of actions generates at least a certain amount of revenue, saves at least a certain amount of revenue, increases efficiency/speed of a task by at least a certain amount, speeds up the customer acquisition process, reduces the number of communications that are required, a combination thereof, etc. Such importance metric(s) may assist in the identification of sequences and processes that should be automated first and would benefit the most from RPA.

To find sequences, n-grams may be applied using a sliding window. See FIG. 8, for example. For instance, if the current value of n is 5, the first 5 interactions by a user may be compared to all time-ordered sequences of 5 interactions from other users, then interactions 2-6, 3-7, 4-8, etc. may be compared until all time ordered sets of the user's interactions of that size have been compared to those of other users being considered. Alternatively, all user interactions of the sizes of n that are being considered could be identified and retrieved from the time-ordered sequence of interactions for each user and stored in a database. For each n, matching sequences and the number of matches could be identified without using a sliding window. Importance metric(s) could also be applied to these matching sequences.

In some embodiments, the AI/ML model or process that calls the AI/ML model is able to associate the interactions in the identified matching sequences with respective RPA activities. For instance, an interaction where the user clicks a "Submit" button may be associated with one or more RPA activities that identify the button on the screen, move the mouse to be within the area of the button, and click it. The AI/ML model, or some other application using the AI/ML model to identify sequences or the output thereof, may thus generate a "skeleton" RPA workflow that can be reviewed by an RPA developer, modified as desired, and implemented as an RPA robot. Chains of tasks may be used to create a draft RPA workflow, which can then be exported to an RPA designer application. Alternatively, an RPA developer may be provided with the sequence and be instructed to build a workflow implementing the sequence. Over time, the AI/ML model may become accurate enough that workflows for the sequences are created, and RPA robots implementing the workflows are generated and deployed, without human action.

Some sequences of interactions may be at least slightly different, but accomplish the same task. In order to identify that such sequences are functionally the same, some embodiments generate a probability graph that includes loose associations. Each possible or observed interaction, or a subset thereof, may be included as a node in the graph. The AI/ML model may calculate the probability that a user would "hop" from one node to another (i.e., the probability that a user would follow an edge between nodes). For example, if a spreadsheet is open, the probability of a user's next interaction being calculating the sum of a column may be high, but the probability of the next interaction being opening an email application may be relatively low. Edges may provide probabilities between nodes, and potentially of a sequence of nodes as a series of segments therebetween. Such a sequence and its edges may provide a collective probability of starting at one node and arriving at another node via the sequence.

The probability graph may then be "pruned" after determining the edge probabilities to find related sequences. For instance, edge probabilities below 50%, 25%, 10%, etc. may be removed to reduce the number of edges and sequences). A Levenshtein distance, fuzzy matching (e.g., where matching parameters are similar within a certain fuzziness threshold, such as within a 20% variation), and/or any other suitable technique may be used to determine related sequences without deviating from the scope of the invention. For instance, two, three, or more sequences may lead to a certain end node with at least a certain probability, making it likely that users use these at least somewhat different sequences to accomplish the same task.

In some embodiments, the most efficient path among multiple related sequences may be desired. This may be determined based on the number of interactions/steps, the time associated with each step (e.g., as obtained from timestamps in the time-ordered data pertaining to the user interactions), etc. An RPA workflow may then be generated based on the most efficient sequence that accomplishes that task.

In some embodiments, more complex interactions may be recognized and anticipated. For instance, localized control information could be used to determine interactions that are less obvious visually. Consider an example where a user wants to synchronize playlists between two applications (e.g., from iTunes® to Spotify®). A user may typically copy a song title from iTunes®, put the song title in the Spotify® search box, search for the song, and repeat the process for the next song until the playlist is copied. The AI/ML model of some embodiments may recognize that the granular task of copying songs is repeated for all songs in a playlist and prompt the user regarding whether he or she would like to copy all songs in the playlist.

In some embodiments, the AI/ML model may learn to automatically complete fields based on observing examples. For instance, if a user creates accounts from a data source that require various information from that data source, the AI/ML model may observe that the user has entered information in several fields, generate a script to auto-fill all fields, and then ask the user whether he or she would like the fields to be automatically filled. The AI/ML model could be deep learning neural network (DLNN)-trained, shallow learning neural network (SLNN)-trained, RNN-trained, generative adversarial network (GAN)-trained, a combination thereof, deterministic, etc. An advantage of a deterministic, rule-based system for some applications is that it typically requires fewer examples to train.

In some embodiments, the AI/ML may be trained to recognize desirable outcomes and to determine the process (es) that lead to the desirable outcomes. For instance, the AI/ML model may be trained to recognize that an account was created, a new user was added, revenue was generated, a problem was resolved, etc. The AI/ML model may then look backwards in the data pertaining to the user interactions or the user interactions themselves to recreate the sequence that lead to the desirable outcome. The AI/ML model or another process could then associate the interactions with activities and generate an RPA workflow that implements the sequence/process. This may be called "programming by example," where examples are provided to the AI/ML model, which then generates a program that can replicate the desirable end state.

Modern networks are essentially large probability graphs. Once a desirable outcome is determined, the AI/ML model may look backwards at the priors and rate what mattered the most to achieve the desired outcome. If it is determined that revenue increased as an outcome, the signal that lead to the outcome may be resolved into sub-signals, and it may be determined which sub-signal(s) lead to the revenue increase.

In some embodiments, back propagation may be used for neural networks. Much of modern deep learning is based on backpropagation algorithms, which are mathematically founded in optimization theory. Many recent modifications and improvements to deep learning owe much of their structure to what is known of how information is processed by the architecture of the human brain. In other words, deep learning typically makes use of a layered, feedforward network similar to the early layers of the visual cortex. The nonlinearities at each layer are usually threshold nonlinearities, as are found in mean-field approximations of neuronal integrate-and-fire models. Convolutional deep networks implement an approximate translational symmetry that is also found in the visual cortex. Various techniques may be used for backpropagating errors in neural networks, including, but not limited to: (1) providing a second network to backpropagate errors; (2) providing differences in basal and apical dendritic responses to spiking input to justify backpropagation through the same layers as forward propagation; (3) using global reinforcement learning; (4) using bidirectional recirculation in recurrent networks; and (5) using contrastive Hebbian learning.

Neural networks are typically pulse-gated, where whether a "neuron" fires is based on the strength of the pulse and a mathematical function assigned to the neuron. Information comes in and leaves in the form of "spikes". A spike is an event and a "synapse" governs how much a downstream neuron responds to the event. Spikes from one neuron may thus propagate to others, depending on the specific connections and logic of the neural network.

The nature of these connections and synapses controls behavior. A given neuron may take the synaptic weights of incoming synapses for which a spiking event occurred, sum them, and then determine whether to generate a spike. Spikes may not vary in intensity in some embodiments and are thus somewhat analogous to one bit being sent out. Typical implementations may include neurons connected on a bus where communication is a time stamp. In other words, a spike is emitted as an event from one neuron at a certain time and is subsequently received by downstream neurons.

When the information gets to the downstream neurons, a thresholded activity function may be used where nothing happens if the value is below a threshold, but then the function linearly responds above the threshold (i.e., a rectified linear unit (ReLU)). ReLU functions are often used in deep learning since real neurons can have approximately similar activity functions. Via linear transforms, information can be subtracted, added, etc. In supervised learning, a known output may be computed with network output and error may be computed with a cost function from known target output, which gives the error for backpropagation. Error may be computed at the output, and this error may be transformed into corrections for network weights to minimize the error.

The standard learning algorithm of some embodiments is Hebbian learning, which modifies the weights by updating individual synapses based on the product of the firing rates in pre-synaptic neurons and the firing rates at the receiving neurons (i.e., the post-synaptic neurons). For Hebbian learning (i.e., synaptic modification) to take place, pre-synaptic and post-synaptic firing rates should be non-zero within a relatively short window of time. Otherwise, synapses are not modified. In some embodiments, outside of this window of time, the synaptic weight may decrease proportional to its value.

Via pulse-gating, firing rates may be propagated to pre-synaptic and post-synaptic neurons within a window of time during which Hebbian learning takes place. Thus, using pulse-gated learning, and hence, synaptic modification, firing rates can control the onset and offset of learning and may be used for synaptic weight updates to implement the backpropagation algorithm.

Backpropagation is a technique for optimizing synaptic weights in a feedforward neural network. In the case of supervised learning, a column vector input x is processed through a series of N nonlinear activity functions $f_i$ between each layer i=1, ..., N of the network, with the output at a given layer first multiplied by a synaptic matrix $W_i$, and with a bias vector $b_1$ added. The network output o, given by $$o = f_N(W_N f_{N-1}(W_{N-1} f_{N-2}(\ldots f_1(W_1 x + b_1) \ldots) + b_{N-1}) + b_N) \quad (1)$$

In some embodiments, o is compared with a target output t, resulting in an error $E = \frac{1}{2}\|o-t\|^2$, which is desired to be minimized.

Using backpropagation, backward propagation of errors for synaptic weight update may be performed. This allows for strengthening of the "neurons" that tend to lead to a desirable outcome. Potentially somewhat similar to the probability graph process discussed above, the nodes that appear to lead to the desirable outcome may be iteratively strengthened until the desirable outcome can be reproduced. The connections between the nodes and their probabilistic weights may make their behavior almost analog in nature.

Per the above, in some embodiments, determined sequences of user interactions may be prioritized based on various metrics. For instance, sequences that are more common, provide a greater time savings to users through automation, etc. may be prioritized for RPA workflow generation. RPA robots implementing the sequences may be generated and deployed to the user computing systems to accomplish the tasks Associated with the common sequences.

Typically, automating a significant number of sequences of user interactions (e.g., 100) would require a substantial amount of code in a programming language. However, some embodiments generate RPA robots that implement sequences of user interactions with much less or no coding. Indeed, task mining may be performed exclusively via AI, or via AI with some human supplementing.

In some embodiments, sequences may not need to be recognized at all. For example, associations between interactions and repetition may be tracked. Neural networks can remember associative data without memory overhead. Whereas traditionally, reverse indexes are used where if a user performs an action, another action is taken using the reverse index. However, these reverse indexes can become very large from a resource perspective in real world systems. Neural networks, on the other hand, can be trained to accomplish the same or similar outcomes by strengthening nodes in the neural network for the association graph without this memory overhead.

In some embodiments, AI can be used to perform the entire process end-to-end. For instance, AI/ML model(s) may be used to determine which applications users are using, their graphical elements, and user interactions, determine common sequences of user interactions, and automatically build and deploy an RPA robot that implements the sequence of interactions at runtime without design time development. Training data may then be obtained from users regarding scenarios where the automatically developed robots do work or an anomaly is encountered, and this training data can be used to retrain the RPA robots and deploy them. The training data may include regions in images where misidentifications occurred or elements were missed, label corrections, input corrections, etc. This process may be repeated to iteratively improve the robots.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
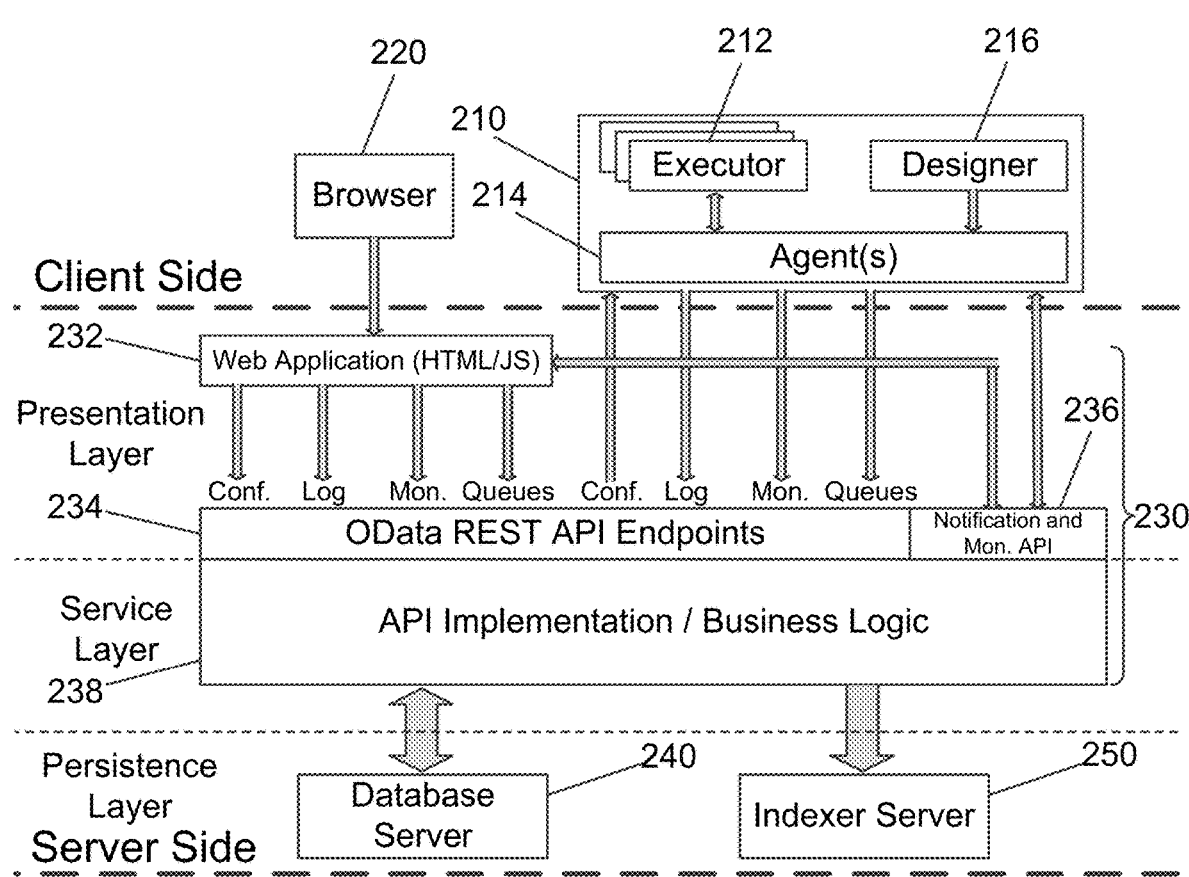
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
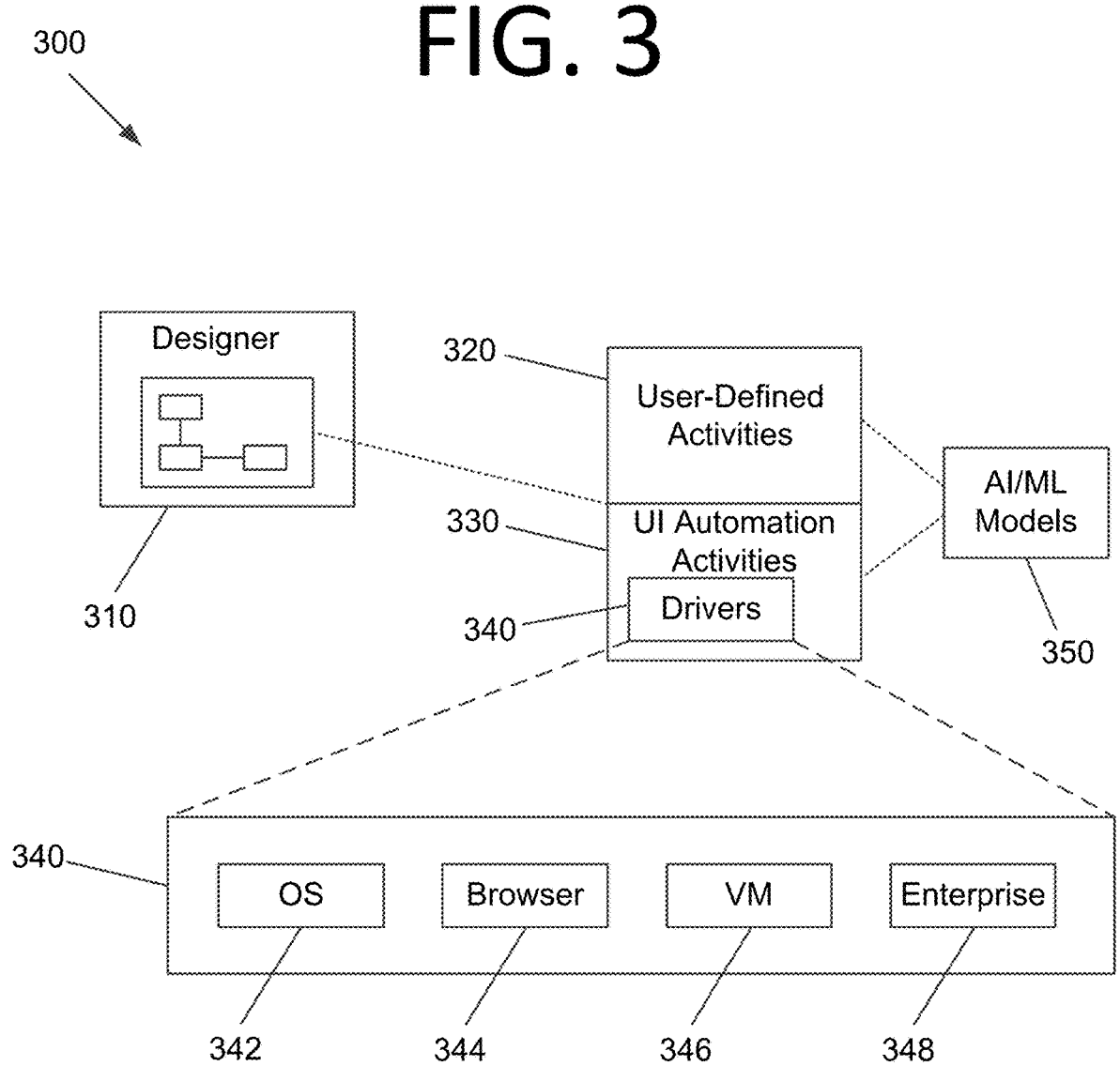
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
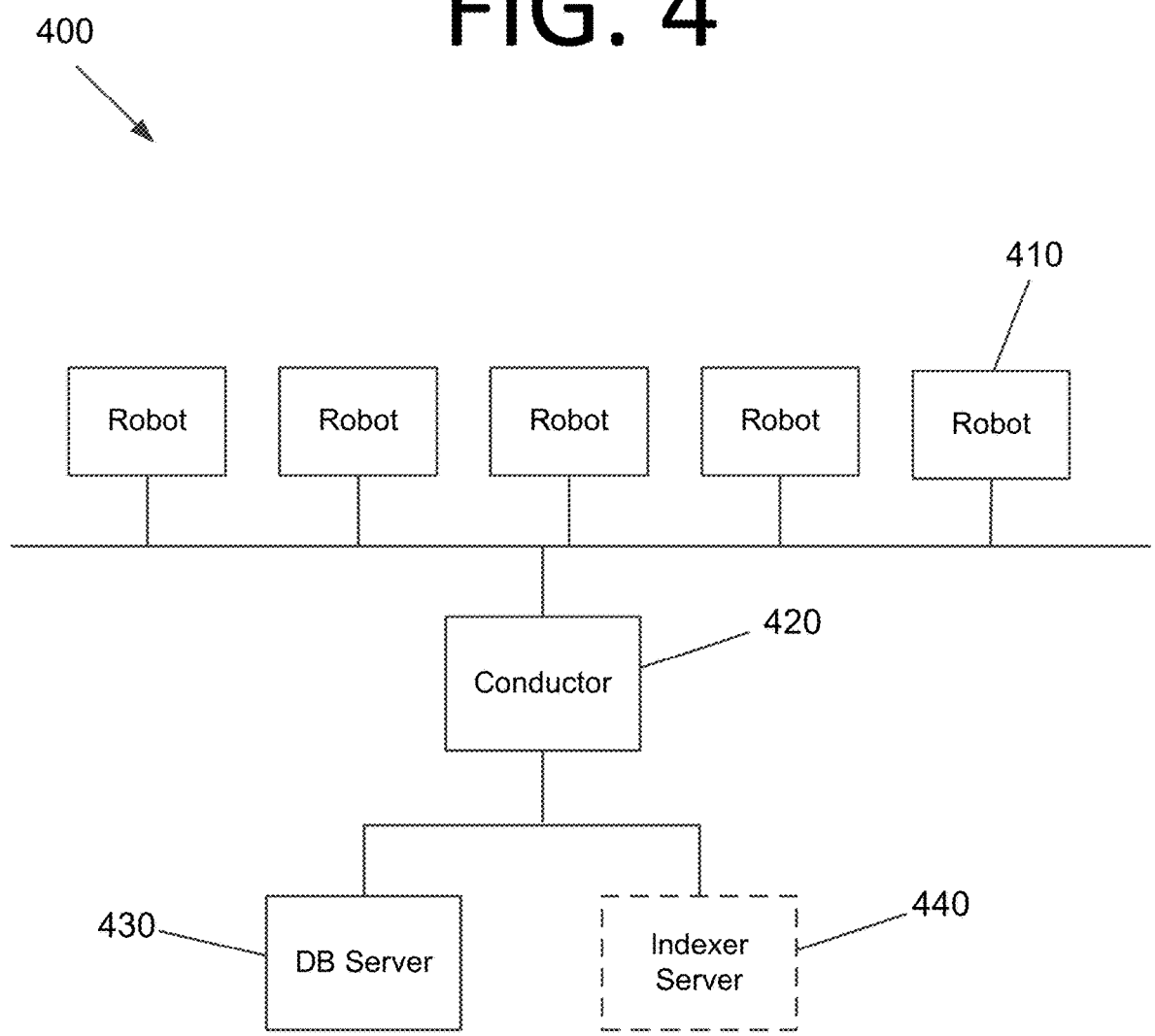
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
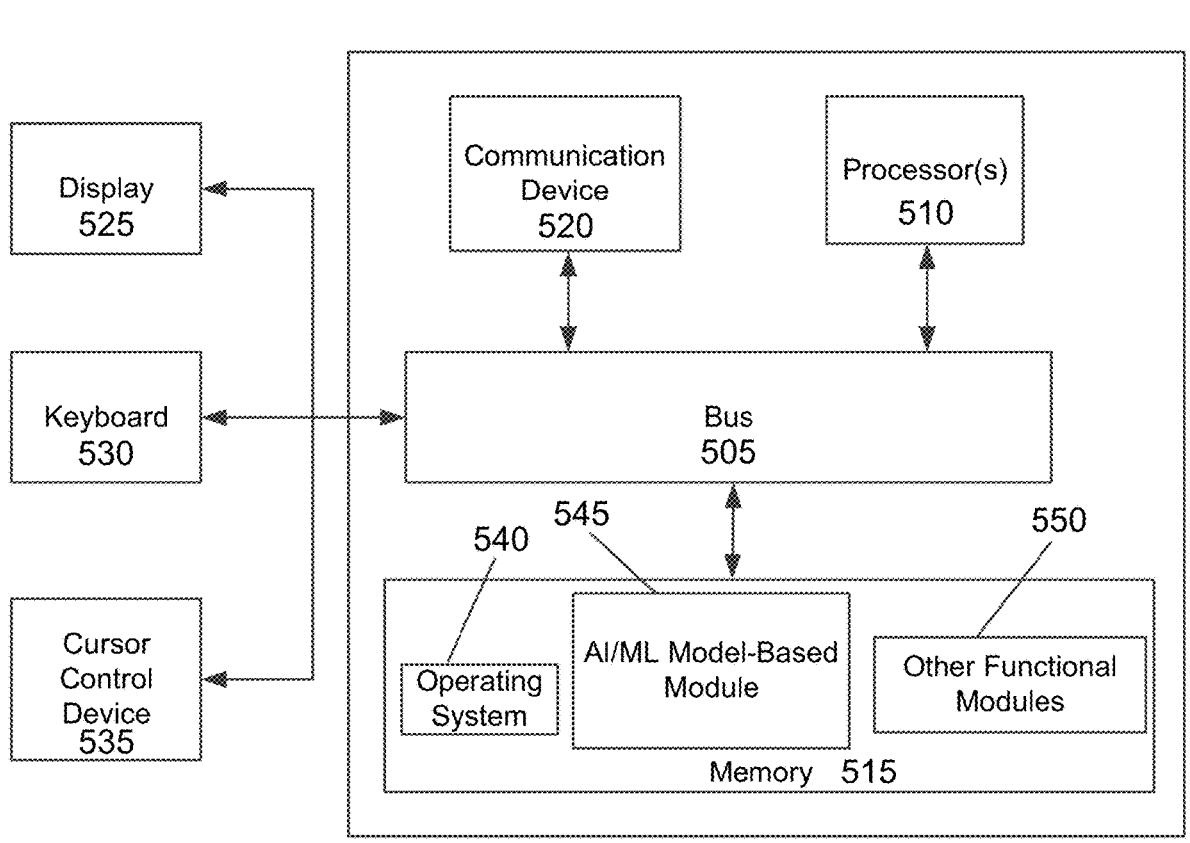
FIG. 5 is an architectural diagram illustrating a computing system configured to determine sequences of user interactions with computing systems, extract common processes, and generate RPA robots using AI/ML models, according to an embodiment of the present invention.

FIG. 5 is an architectural diagram illustrating a computing system 500 configured to determine sequences of user interactions with computing systems, extract common processes, and generate RPA robots using AI/ML models, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an AI/ML model-based module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
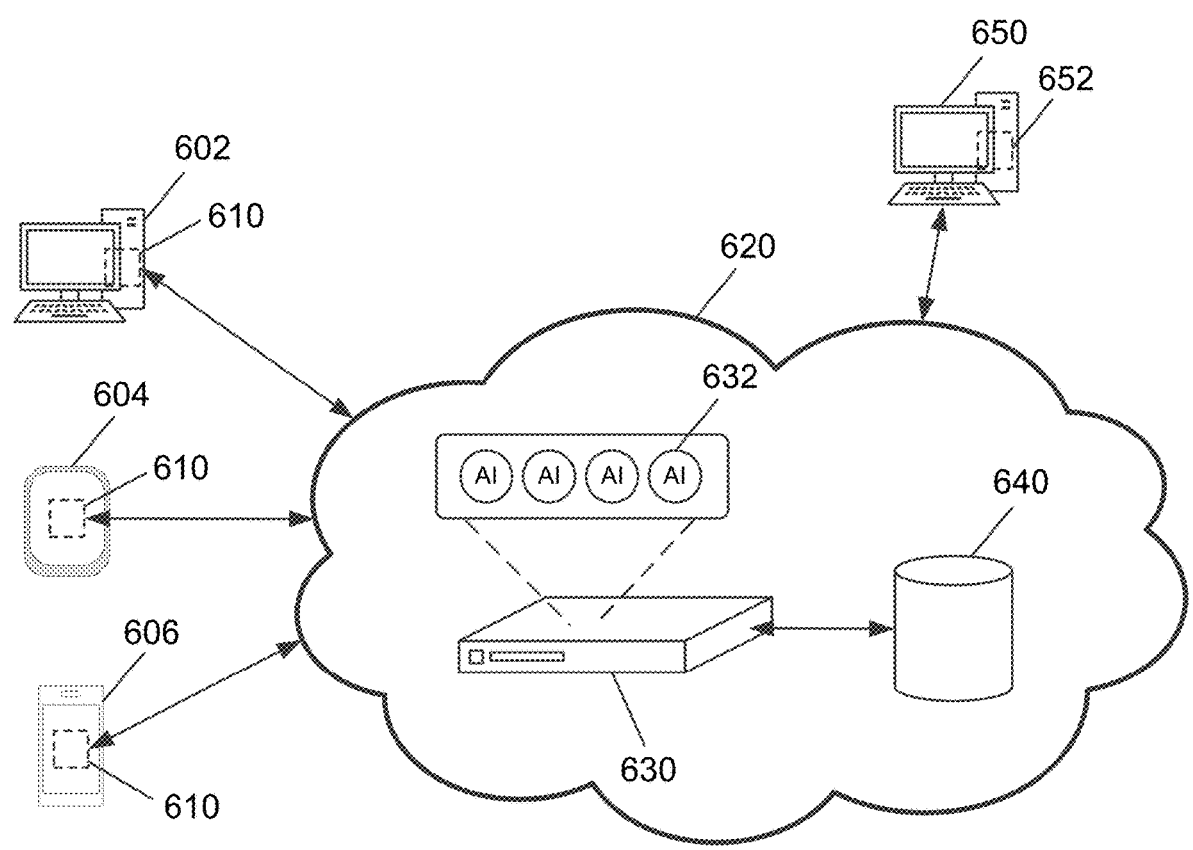
FIG. 6 is an architectural diagram illustrating a system configured to determine sequences of user interactions with computing systems, extract common processes, and generate RPA robots using AI/ML models, according to an embodiment of the present invention.

FIG. 6 is an architectural diagram illustrating a system 600 configured to determine sequences of user interactions with computing systems, extract common processes, and generate RPA robots using AI/ML models, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, etc. Also, while three user computing systems are shown in FIG. 6, any suitable number of computing systems may be used without deviating from the scope of the invention. For instance, in some embodiments, dozens, hundreds, thousands, or millions of computing systems may be used.

Each computing system 602, 604, 606 has a recorder process 610 running thereon that records screenshots and/or video of the user's screen or a portion thereof. For instance, a snippet of JavaScript® may be embedded in a web browser as recorder process 610 to track what components the user interacts with, what text the user enters, what locations/components the user clicks with the mouse, what content the user scrolled past, how long the user stopped on a certain part of the content, etc. Scrolling past content may indicate that the content may have been somewhat close but did not have exactly what the user wanted. Clicks may indicate success.

Recorder processes 610 need not be JavaScript®, and may be any suitable type of application and in any desired programming language without deviating from the scope of the invention. This may allow "generalizing" of recorder processes 610 such that they can track user interactions with multiple applications or any application that the user is interacting with. Using labeled training data from scratch may be difficult since while it may allow the AI/ML model to learn to recognize various controls, it does not contain information regarding which controls are commonly used and how. Using recorder processes 610, a "heat map" could be generated to help bootstrap the AI/ML model training process. The heat map may include various information, such as the frequency that a user used applications, the frequency that the user interacted with components of the applications, the locations of the components, the content of the applications/components, etc. In some embodiments, the heat map may be derived from screen analysis, such as detection of typed and/or pasted text, caret tracking, and active element detection for computing systems 602, 604, 606. Some embodiments recognize where on the screen associated with computing systems 602, 604, 606 the user has been typing or pasting text, potentially including hot keys or other keys that do not cause visible characters to appear, and provide the physical position on the screen based on the current resolution (e.g., in coordinates) of where one or more characters appeared, where the cursor was blinking, or both. The physical position of the typing or pasting activity and/or of the caret may allow determination of which field(s) the user is typing in or focused on and what the application is for process discovery or other applications.

Per the above, in some embodiments, recorder processes 610 may record additional data to further assist in training AI/ML model(s), such as web browser history, heat maps, key presses, mouse clicks, locations of mouse clicks and/or graphical elements on the screen that the user is interacting with, locations where the user was looking on the screen at different times, time stamps associated with the screenshot/video frames, etc. This may be beneficial for providing key presses and/or other user actions that may not cause a screen change. For instance, some applications may not provide a visual change when the user presses CTRL+S to save a file. However, in certain embodiments, the AI/ML model(s) may be trained solely based on captured screen images. Recorder processes 610 may be robots generated via an RPA designer application, part of an operating system, a downloadable application for a personal computer (PC) or smart phone, or any other software and/or hardware without deviating from the scope of the invention. Indeed, in some embodiments, the logic of one or more of recorder processes 610 is implemented partially or completely via physical hardware.

Some embodiments are implemented in a feedback loop process that continuously or periodically compares the current screenshot to the previous screenshot to identify changes. Locations where visual changes occurred on the screen may be identified and OCR may be performed on the location where the change occurred. Results of the OCR may then be compared to the content of a keyboard queue (e.g., as determined by key hooking) to determine whether a match exists. The locations where the change occurred may be determined by comparing a box of pixels from the current screenshot to a box of pixels in the same location from a previous screenshot.

Images and/or other data (e.g., web browser history, heat maps, key presses, mouse clicks, locations of mouse clicks and/or graphical elements on the screen that the user is interacting with, locations where the user was looking on the screen at different times, time stamps associated with the screenshot/video frames, voice inputs, gestures, emotions (e.g., whether a user is happy, frustrated, etc.), biometrics (e.g., fingerprints, retinal scans, the user's pulse, etc.), information pertaining to periods of no user activity (e.g., "dead man switches"), haptic information from a haptic display or touch pad, a heat map with multi-touch inputs, etc.) that are recorded by recorder processes 610 are sent via a network 620 (e.g., a local area network (LAN), a mobile communications network, a satellite communications network, the Internet, any combination thereof, etc.) to a server 630. In some embodiments, server 630 may be part of a public cloud architecture, a private cloud architecture, a hybrid cloud architecture, etc. In certain embodiments, server 630 may host multiple software-based servers on a single computing system 630. In some embodiments, server 630 may run a conductor application and the data from recorder processes 610 may be sent periodically as part of the heartbeat message. In certain embodiments, the data may be sent from recorder processes 610 to server 630 once a predetermined amount of data has been collected, after a predetermined time period has elapsed, or both. Server 630 stores the received data from recorder processes 610 in a database 640.

Server 630 includes AI/ML models 632. In some embodiments, AI/ML models 632 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to identify sequences of user interactions. AI/ML models 632 may perform various tasks, such as extracting user interactions from recorder processes 610, determining sequences of the extracted user interactions, generating RPA robots, etc. In some embodiments, an AI/ML model for determining sequences of user interactions may be provided with the interactions that have been recognized by another AI/ML model, along with times that the user interactions occurred, locations on the screen, etc.

In some embodiments, AI/ML models 632 for recognizing sequences of tasks may be provided with user interactions that have already been recognized by another AI/ML model. However, in certain embodiments, AI/ML models 632 go through a training phase using data from the user interactions as input and an AI/ML model 632 are trained until AI/ML model 632 is sufficiently accurate, but not overfit to the training data. The accuracy that is acceptable may depend on the application. Identification errors can be highlighted by a human reviewer (e.g., by drawing a box around the misidentified element and including the correct identification), and AI/ML model 632 can be retrained using this additional labeled data. Once adequately trained, AI/ML model 632 is able to provide predictions as output, such as which application(s) and graphical element(s) are recognized as being present in a screen.

However, while this level of training provides information regarding what is present, further information may be needed to determine user interactions, such as comparing two or more consecutive screens to determine that a typed character appeared from one to another, a button was pressed, a menu selection occurred, etc. Thus, after AI/ML model 632 can recognize graphical elements and applications on the screen, in some embodiments, AI/ML model 632 is further trained to recognize labeled user interactions with the applications in the UI to understand such incremental actions taken by the user. Identification errors can again be highlighted by a human reviewer (e.g., by drawing a box around the misidentified element and including the correct identification), and AI/ML model 632 can be trained until its accuracy is sufficiently high to be deployed to understand granular user interactions with the UI.

Once trained to recognize user interactions in some embodiments, trained AI/ML model 632 may be used to analyze video, previously identified user interactions, and/or other information from recorder processes 610. This recorded information may include interactions that multiple/many users tend to perform. These interactions can then be analyzed for common sequences for subsequent automation.

AI/ML model 632 (whether the same AI/ML model that identifies user interactions or a separate AI/ML model to be utilized for sequence recognition) needs to be trained to recognize sequences of interactions as tasks in some embodiments. This may be accomplished by applying n-grams of multiple sizes to search for matching sequences in the data. AI/ML model 632 may be trained to use a range of sizes of n that tend to identify meaningful sequences (e.g., based on frequency, importance metric(s), etc.). In some embodiments, the n-grams are applied to the sequences of user interactions over a sliding window to identify matching sequences.

AI/ML model 632 may also be trained to associate user interactions in the sequences with RPA activities. This may be accomplished by a human reviewer initially identifying the RPA activity for the given user interaction. AI/ML model 632 may learn over time to anticipate activities for somewhat new interactions. For instance, if previous activities for a menu item involve finding a "Submit" button image on the screen, moving the mouse to be located over the area of the button, and clicking the button, AI/ML model 632 may learn to perform a similar process for an "OK" button, a "Next" button, etc.

After AI/ML model 632 can associate the interactions with the respective activities, AI/ML model 632 or another process may be trained to generate an RPA workflow with a sequence of activities accomplishing the task of the sequence of user interactions. The generated RPA workflow may then be used to generate and deploy an RPA robot or the workflow may be sent to an RPA developer for review, such as via an application 652 (e.g., an RPA designer application) of a computing system 650 that allows the RPA developer to view and modify the RPA workflow. In some embodiments, AI/ML model 632 may initially send the workflows to the RPA developer, and after the RPA developer has accepted a certain number of RPA workflows without modification, switch to automatically generating and deploying RPA robots implementing the workflow logic without human interaction.

In some embodiments, AI/ML model 632 may be trained to recognize sequences of user interactions that accomplish the same task, but are at least slightly different. AI/ML model 632 may generate a probability graph that includes loose associations between the user interactions. The probability graph may then be "pruned" to determine which sequences are related. For instance, interactions may be removed and AI/ML model 632 may check whether the same task is accomplished. A Levenshtein distance, fuzzy matching, and/or any other suitable technique may be used to determine related sequences without deviating from the scope of the invention.

In some embodiments, AI/ML model 632 may be trained to determine the most efficient path among multiple related sequences. This may be determined based on the number of interactions/steps, the time associated with each step (e.g., as obtained from timestamps in the time-ordered data pertaining to the user interactions), etc. An RPA workflow may then be generated based on the most efficient sequence that accomplishes that task.

In some embodiments, AI/ML model 632 may be trained to recognize desirable outcomes without initially analyzing sequences of user interactions. For instance, AI/ML model 632 may be trained to recognize that an account was created, a new user was added, revenue was generated, a problem was resolved, etc. AI/ML model 632 may then look backwards in the data pertaining to the user interactions or the user interactions themselves to recreate the sequence that lead to the desirable outcome. AI/ML 632 model or another process could then associate the interactions with activities and generate an RPA workflow that implements the sequence.

Modern networks are essentially large probability graphs. Once a desirable outcome is determined, AI/ML model 632 may look backwards at the priors and rate what mattered the most to achieve the desired outcome in some embodiments. If it is determined that revenue increased as an outcome, the signal that lead to the outcome may be resolved into sub-signals, and it may be determined which sub-signal(s) lead to the revenue increase.

In some embodiments, sequences may not need to be recognized at all. For example, AI/ML model 632 may be trained to recognize and track associations between interactions and repetition thereof. If AI/ML model 632 is a neural network, for instance, based on an association graph, AI/ML model 632 may strengthen nodes in the neural network in order to tend to choose the interactions that lead to the desirable outcome.

Per the above, in some embodiments, AI can be used to perform the entire process end-to-end. For instance, AI/ML model(s) 632 may be used to determine which applications users are using, their graphical elements, and user interactions, determine common sequences of user interactions, and automatically build and deploy an RPA robot that implements the sequence of interactions at runtime without design time development. Training data may then be obtained from users of computing systems 602, 604, 606 regarding scenarios where the automatically developed robots do work or an anomaly is encountered, and this training data can be provided to server 630 and used to retrain AI/ML model 632. The training data may include regions in images where misidentifications occurred or elements were missed, label corrections, input corrections, etc. This process may be repeated to iteratively improve the RPA robots.

AI Layers

In some embodiments, multiple AI layers may be used. Each AI layer is an algorithm (or model) that runs on the data, and the AI model itself may be deep learning neural networks (DLNNs) of trained artificial "neurons" that are trained in training data. Layers may be run in series, in parallel, or a combination thereof.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in the screens. For example, one AI layer could perform OCR, another could detect buttons, another could compare sequences, etc. Patterns may be determined individually by an AI layer or collectively by multiple AI layers.

FIG. 7 is a flowchart illustrating a process 700 for determining sequences of user interactions with computing systems, extracting common processes, and generating RPA robots using AI/ML models, according to an embodiment of the present invention. The process begins with providing an AI/ML model with data including time-ordered interactions of a plurality of users with respective user computing systems at 710. The AI/ML model is then trained to recognize related sequences in the data at 720. In some embodiments, the training includes training the AI/ML model to recognize related sequences of user interactions that pertain to tasks in the time-ordered sequences of user interactions by comparing n-grams of sequences of user interactions in recorded data from the computing systems over a sliding window to find the related sequences. The n-grams may include two or more values of n.

In some embodiments, the training includes training the AI/ML model to use one or more importance metrics when determining whether a task is found in the related sequences. In certain embodiments, the one or more importance metrics include whether a related sequence of actions generates at least a certain amount of revenue, saves at least a certain amount of revenue, increases efficiency and/or speed of a task by at least a certain amount, speeds up a customer acquisition process, reduces a number of communications that are required, or a combination thereof. In some embodiments, the training includes training the AI/ML model to determine a lowest value of n such that a majority of sequences of at least size n pertain to tasks performed by the users. In certain embodiments, the training includes training the AI/ML model to determine a highest value of n such that n-grams above the highest value of n are not considered. In some embodiments, the training includes training the AI/ML model or an RPA designer application to associate user interactions with RPA activities. In certain embodiments, a minimum number of related sequences is required for the AI/ML model to determine that the sequence pertains to a task.

The trained AI/ML model is then deployed at 730. In some embodiments, the deployed AI/ML model is configured to be called by one or more RPA robots. Recorded real user interactions of a plurality of users with respective computing systems are analyzed and sets of matching sequences in the recorded real user interactions are determined by the trained AI/ML model at 740. In some embodiments, the determining of the sets of matching sequences includes generating a probability graph including associations between sequences of user interactions, by the AI/ML model, pruning the probability graph to remove unrelated user interactions and sequences, by the AI/ML model, and determining that sequences of user interactions match as part of a set of the set of matching sequences based on the pruned probability graph, by the AI/ML model. In certain embodiments, the determination of whether the sequences match is performed using a Levenshtein distance, fuzzy matching, or a combination thereof.

A most efficient sequence of each set of matching sequences is determined at 750. In some embodiments, the determination of the most efficient sequence is based on a number of user interactions in the sequence, a time associated with user interactions in the sequence, or a combination thereof. RPA workflows implementing the most efficient sequences are then generated at 760. The RPA workflows include activities that implement user interactions of the sequences. In certain embodiments, the one or more generated RPA workflows are made accessible to one or more RPA designer applications at 770 so an RPA developer can edit the workflows, if desired. Additionally or alternatively, respective RPA robots are generated using the most efficient sequences at 780. The one or more generated RPA robots may then be deployed to one or more user computing systems at 790.

FIG. 8 is a flowchart illustrating a process 800 for performing process extraction based on a desirable end state using AI/ML models and generating RPA robots, according to an embodiment of the present invention. The process begins with providing an AI/ML model with data including time-ordered interactions of a plurality of users with respective user computing systems at 810. The AI/ML model is then trained to recognize desirable outcomes at 820 and to determine the process(es) that lead to the desirable outcomes at 830. For instance, the AI/ML model may be trained to recognize various desirable states, such as that an account was created, a new user was added, revenue was generated, a problem was resolved, etc. The AI/ML model may then look backwards in the data pertaining to the user interactions or the user interactions themselves to recreate the sequence that lead to the desirable outcome. In some embodiments, once a desirable outcome is determined, the AI/ML model may look backwards at the priors and rate what mattered the most to achieve the desired outcome. The signal that lead to the outcome may be resolved into sub-signals, and it may be determined which sub-signal(s) lead to the desirable. The AI/ML model is then deployed at 840.

Desirable outcomes in recorded real user interaction data are then determined by the AI/ML model at 850. The AI/ML model then determines the user interactions that lead to the desirable outcome (e.g., by trying time-ordered interactions before the desirable outcome was achieved to attempt to replicate the desirable outcome) or experiments with strengthening nodes in neural network priors until the desirable outcome can be replicated at 860. RPA workflows leading to the desirable outcomes are then generated at 870 (e.g., by adding activities associated with the user interactions to the RPA workflows, adding one or more activities that call one or more AI/ML models that have been trained to perform the task via backpropagation, etc.). The one or more generated RPA workflows are made accessible to one or more RPA designer applications, respective RPA robots are generated/deployed, or both, at 880.

FIG. 9 illustrates comparisons of n-grams representing sequences of user interactions, according to an embodiment of the present invention. In this example, sequence 900 represents a time-ordered series of interactions for a first user, sequence 910 represents a time-ordered series of interactions for a second user, and sequence 920 represents a time-ordered series of interactions for a third user. Interactions of any number of users may be compared without deviating from the scope of the invention. Here, the n-gram size for comparison is 5.

Initially, a 5-gram 902 of the first five interactions of the first user (A1, A2, AA3, A4, A5) is compared to the time-ordered 5-grams in sequences 910 and 920. Any number of different interactions may be identified and compared without deviating from the scope of the invention. In this example, both sequence 910 and sequence 920 include respective matching 5-grams 912, 922 in the first 12 interactions. Since three matching 5-gram sequences 902, 912, 922 are found, this may indicate that this 5-gram is a potential candidate for process automation. The number of matches may also be stored in some embodiments.

After the matching sequences of 5-grams are identified for the first user, the 5-grams for the second use may be compared to the third user and any subsequent users to find new matches, potentially with the matching sequences that have already been found removed (e.g., by storing the interactions in a queue data structure and removing them from the queue when a match is found). This process may be repeated for all users until the second-to-last user's interactions have been analyzed. If a range of n values is to be considered, n may be incremented, and the process may be repeated until all n-gram sizes in the range have been analyzed.

The process steps performed in FIGS. 7 and 8 may be performed by a computer program, encoding instructions for the processor(s) to perform at least part of the process(es) described in FIGS. 7 and 8, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7 and 8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
providing, by a computing system, an artificial intelligence (AI)/machine learning (ML) model with data comprising time-ordered interactions of a plurality of users with respective user computing systems;
training the AI/ML model, by the computing system, to recognize related sequences of user interactions that pertain to tasks in the time-ordered sequences of user interactions of the plurality of users by comparing n-grams of sequences of user interactions in recorded data from the computing systems over a sliding window to find the related sequences, the n-grams comprising two or more values of n; and
deploying the trained AI/ML model.

2. The computer-implemented method of claim 1, wherein the deployed AI/ML model is configured to be called by one or more robotic process automation (RPA) robots.

3. The computer-implemented method of claim 1, wherein the training further comprises training the AI/ML model to determine a lowest value of n such that a majority of sequences of at least size n pertain to tasks performed by the users.

4. The computer-implemented of claim 1, wherein a minimum number of related sequences is required for the AI/ML, model to determine that the sequence pertains to a task.

5. The computer-implemented method of claim 1, wherein the training further comprises training the AI/ML model to determine a highest value of n such that n-grams above the highest value of n are not considered.

6. The computer-implemented method of claim 1, further comprising:
training the AI/ML model to use one or more importance metrics when determining whether a task is found in the related sequences, by the computing system.

7. The computer-implemented method of claim 6, wherein the one or more importance metrics comprise whether a related sequence of actions generates at least a certain amount of revenue, saves at least a certain amount of revenue, increases efficiency and/or speed of a task by at least a certain amount, speeds up a customer acquisition process, reduces a number of communications that are required, or a combination thereof.

8. The computer-implemented of claim 1, further comprising:
training the AI/ML model or a robotic process automation (RPA) designer application to associate user interactions with RPA activities.

9. The computer-implemented method of claim 8, further comprising:
analyzing recorded real user interactions of a plurality of users with respective computing systems and determining sets of related sequences in the recorded real user interactions, by the AI/ML model; and
generating one or more respective robotic process automation (RPA) workflows comprising activities that implement user interactions of the determined sets of related sequences.

10. The computer-implemented method of claim 9, further comprising:
generating respective RPA robots implementing the one or more generated RPA workflows; and
deploying the one or more generated RPA robots to one or more user computing systems.

11. The computer-implemented method of claim 9, further comprising:
making the one or more generated RPA workflows accessible to one or more RPA designer applications.

12. The computer-implemented method of claim 9, wherein the determining of the sets of related sequences comprises:
generating a probability graph comprising associations between sequences of user interactions, by the AI/ML model;
pruning the probability graph to remove unrelated user interactions and sequences, by the AI/ML model; and
determining that sequences of user interactions match as part of a set of the set of related sequences based on the pruned probability graph, by the AI/ML model.

13. The computer-implemented method of claim 12, wherein the determination of whether the sequences match is performed using a Levenshtein distance, fuzzy matching, or a combination thereof.

14. The computer-implemented method of claim 9, further comprising:
determining a most efficient sequence of a set of related sequences to generate an RPA workflow based on one or more efficiency metrics; and
generating the respective RPA workflow using the most efficient sequence.

15. The computer-implemented method of claim 14, wherein a metric of the one or more efficiency metrics for the determination of the most efficient sequence is based on a number of user interactions in the sequence, a time associated with user interactions in the sequence, or a combination thereof.

16. A non-transitory computer-readable medium storing a computer program, the computer program configured to cause at least one processor to:
analyze recorded real user interactions of a plurality of users with respective computing systems and determine sets of related sequences in the recorded real user interactions, by an artificial intelligence (AI)/machine learning (ML) model; and generate one or more respective robotic process automation (RPA) workflows comprising activities that implement user interactions of the determined sets of related sequences, wherein a minimum number of related sequences is required for the AI/ML model to determine that the sequence pertains to a task.

17. The non-transitory computer-readable medium of claim 16, wherein the determining of the sets of related sequences comprises:

generating a probability graph comprising associations between sequences of user interactions, by the AI/ML model;

pruning the probability graph to remove unrelated user interactions and sequences, by the AI/ML model; and determining that sequences of user interactions match as part of a set of the set of related sequences based on the pruned probability graph, by the AI/ML model.

18. The non-transitory computer-readable medium of claim 16, wherein the computer program is further configured to cause the at least one processor to:

determine a most efficient sequence of the set of related sequences to generate an RPA workflow based on one or more efficiency metrics; and generate the respective RPA workflow using the most efficient sequence.

19. The non-transitory computer-readable medium of claim 18, wherein a metric of the one or more efficiency metrics for the determination of the most efficient sequence is based on a number of user interactions in the sequence, a time associated with user interactions in the sequence, or a combination thereof.

20. The non-transitory computer-readable medium of claim 16, wherein the determining of the sets of related sequences in the recorded real user interactions comprises using one or more importance metrics, and the one or more importance metrics comprise whether a related sequence of actions generates at least a certain amount of revenue, saves at least a certain amount of revenue, increases efficiency and/or speed of a task by at least a certain amount, speeds up a customer acquisition process, reduces a number of communications that are required, or a combination thereof.

21. A computing system, comprising:
memory storing computer program instructions; and
at least one processor configured to execute the computer program instructions, wherein the computer program instructions are configured to cause the at least one processor to:

analyze recorded real user interactions of a plurality of users with respective computing systems and determine related sequences in the recorded real user interactions, by an artificial intelligence (AI)/machine learning (ML) model;

determine a most efficient sequence of the related sequences;

generate a graph or data model comprising associations between sequences of user interactions, by the AI/ML model, and generate one or more respective robotic process automation (RPA) workflows comprising activities that implement user interactions of the determined most efficient related sequence.

22. The computing system of claim 21, wherein the determination of the most efficient sequence is based on a number of user interactions in the sequence, a time associated with user interactions in the sequence, or a combination thereof.

23. The computing system of claim 21, wherein
the determining of the related sequences in the recorded real user interactions comprises using one or more importance metrics, and the one or more importance metrics comprise whether a related sequence of actions generates at least a certain amount of revenue, saves at least a certain amount of revenue, increases efficiency and/or speed of a task by at least a certain amount, speeds up a customer acquisition process, reduces a number of communications that are required, or a combination thereof.

24. The system of claim 21, wherein a minimum number of related sequences are required for generation of a respective RPA workflow.

25. The computer-implemented method of claim 21, wherein a graph is generated comprising the associations between the sequences of user interactions, and the graph is a probability graph.

26. A computer-implemented method, comprising:
providing, by a computing system, an artificial intelligence (AI)/machine learning (ML) model with data comprising time-ordered interactions of a plurality of users with respective user computing systems;

training the AI/ML model, by the computing system, to recognize related sequences of user interactions that pertain to tasks in the time-ordered sequences of user interactions by comparing n-grams of sequences of user interactions in recorded data from the computing systems over a sliding window to find the related sequences, the n-grams comprising two or more values of n; and deploying the trained AI/ML model, wherein
the training further comprises training the AI/ML model to determine a highest value of n such that n-grams above the highest value of n are not considered.

27. The computer-implemented method of claim 26, wherein the training further comprises training the AI/ML model to determine a lowest value of n such that a majority of sequences of at least size n pertain to tasks performed by the users.

28. The computer-implemented of claim 26, wherein a minimum number of related sequences is required for the AI/ML model to determine that the sequence pertains to a task.

* * * * *